United States Patent
Farone et al.

(10) Patent No.: US 10,752,526 B2
(45) Date of Patent: Aug. 25, 2020

(54) METHOD FOR DESTRUCTION OF REDUCIBLE CONTAMINANTS IN WASTE OR GROUND WATER

(71) Applicant: BluFlow Technologies, Inc., New York, NY (US)

(72) Inventors: William A. Farone, Irvine, CA (US); Shane L. Palmer, Coto de Caza, CA (US); Miguel A. Rivera, Orange, CA (US); Christian Taylor, Garden Grove, CA (US); Dwayne Chong, San Dimas, CA (US)

(73) Assignee: Bluflow Technologies, Inc., New York, NY (US)

( * ) Notice: Subject to any disclaimer, the term of this patent is extended or adjusted under 35 U.S.C. 154(b) by 551 days.

(21) Appl. No.: 13/840,382

(22) Filed: Mar. 15, 2013

(65) Prior Publication Data

US 2014/0224741 A1    Aug. 14, 2014

Related U.S. Application Data

(63) Continuation-in-part of application No. 13/764,760, filed on Feb. 11, 2013.

(Continued)

(51) Int. Cl.
*C02F 1/70* (2006.01)
*C02F 1/28* (2006.01)
(Continued)

(52) U.S. Cl.
CPC .............. *C02F 1/70* (2013.01); *C02F 1/28* (2013.01); *C02F 1/42* (2013.01); *C02F 1/444* (2013.01);
(Continued)

(58) Field of Classification Search
None
See application file for complete search history.

(56) References Cited

U.S. PATENT DOCUMENTS 3,092,515 A * 6/1963 Erickson ............ B01D 11/0242
                                                        134/25.5
3,482,703 A    12/1969 Surprenant et al.
(Continued)

FOREIGN PATENT DOCUMENTS

EP         0291330 A2 * 11/1988 ............... C02F 1/42
WO   WO 2009151490 A2 * 12/2009 ............ B01D 15/00
(Continued)

OTHER PUBLICATIONS

Dictionary.com, autoclave (Datasheet, Definition, etc.) [online]. Dictionary.com, LLC, Earliest known availability date as evidenced by Archive.org: Dec. 15, 2006 [retrieved on May 12, 2014]. Retrieved from the Internet: <URL: http://dictionary.reference.com/browse/autoclave>.*

(Continued)

*Primary Examiner* — Krishnan S Menon
*Assistant Examiner* — Brad Gordon
(74) *Attorney, Agent, or Firm* — Joseph V. Saphia; Haug Partners LLP (57) ABSTRACT

A method of decreasing the concentration of certain contaminants in liquids by the chemical reduction of the contaminant using a hydride. A suitable reactor is charged with the contaminated liquid. An amount of catalyst and then an amount of hydride are added to the reactor. The hydride reacts with the contaminant in the liquid, chemically reducing and thus destroying a portion of the contaminant and thereby reducing the concentration of the contaminant in the liquid. Additional hydride can be added to further reduce the concentration to meet a desired level.

10 Claims, 8 Drawing Sheets

Related U.S. Application Data (60) Provisional application No. 61/597,836, filed on Feb. 12, 2012.

(51) Int. Cl.
*C02F 1/42* (2006.01)
*C02F 1/44* (2006.01)
*C02F 101/36* (2006.01)

(52) U.S. Cl.
CPC .......... *C02F 1/705* (2013.01); *C02F 2101/36* (2013.01); *C02F 2209/006* (2013.01)

(56) References Cited

U.S. PATENT DOCUMENTS

| | | | |
|---|---|---|---|
| 4,502,946 A * | 3/1985 | Pronk | B01J 8/003 208/152 |
| 5,174,877 A * | 12/1992 | Cooper | A62D 3/15 204/157.15 |
| 5,196,617 A * | 3/1993 | Kovenklioglu | A62D 3/37 568/755 |
| 5,198,122 A | 3/1993 | Koszalka et al. | |
| 5,531,901 A | 7/1996 | Miyabe et al. | |
| 5,556,545 A | 9/1996 | Volchek et al. | |
| 5,575,919 A | 11/1996 | Santina | |
| 5,795,559 A | 8/1998 | Pinnavaia et al. | |
| 5,958,243 A * | 9/1999 | Lawrence | B01D 61/20 210/137 |
| 5,997,745 A * | 12/1999 | Tonelli | B01D 61/022 210/180 |
| 6,066,257 A * | 5/2000 | Venkatesh | C02F 1/42 210/615 |
| 6,113,797 A * | 9/2000 | Al-Samadi | B01D 61/022 210/650 |
| 6,120,688 A * | 9/2000 | Daly et al. | 210/650 |
| 6,254,779 B1 | 7/2001 | Jeffery et al. | 210/620 |
| 6,419,837 B1 * | 7/2002 | Akse | C02F 1/70 210/752 |
| 6,431,281 B1 * | 8/2002 | McNab, Jr. | C02F 1/705 166/279 |
| 6,534,677 B1 * | 3/2003 | White et al. | 562/486 |
| 6,541,539 B1 | 4/2003 | Yang et al. | |
| 6,592,764 B1 | 7/2003 | Stucky et al. | |
| 6,669,924 B1 | 12/2003 | Kaliaguine et al. | |
| 6,716,378 B2 | 4/2004 | Yang et al. | |
| 6,952,436 B2 | 10/2005 | Wirnsberger et al. | |
| 7,014,799 B2 | 3/2006 | Yang et al. | |
| 7,176,245 B2 | 2/2007 | Stucky et al. | |
| 7,264,732 B2 | 9/2007 | Bradley | |
| 7,520,994 B2 | 4/2009 | Dong et al. | |
| 7,563,457 B2 | 7/2009 | Cha et al. | |
| 7,837,866 B2 | 11/2010 | Burrows | |
| 2003/0134409 A1 * | 7/2003 | Mallouk | B01J 20/20 435/262.5 |
| 2006/0076294 A1 | 4/2006 | Sirkar et al. | |
| 2007/0119786 A1 * | 5/2007 | Schaefer | B01J 23/755 210/757 |
| 2009/0145858 A1 | 6/2009 | Mihara et al. | |
| 2009/0211973 A1 | 8/2009 | Gilron | |
| 2009/0227462 A1 | 9/2009 | Berkowitz et al. | |
| 2011/0056876 A1 | 3/2011 | Ide et al. | |
| 2011/0226990 A1 | 9/2011 | Glennon et al. | |
| 2012/0037840 A1 * | 2/2012 | Stucky | B01D 15/00 252/62.53 |
| 2013/0058724 A1 * | 3/2013 | John et al. | 405/128.5 |
| 2013/0082009 A1 * | 4/2013 | O'Keefe et al. | 210/748.14 |
| 2013/0306268 A1 * | 11/2013 | Ducheyne et al. | 165/63 |

FOREIGN PATENT DOCUMENTS

| | | | | |
|---|---|---|---|---|
| WO | WO-2009151490 A2 * | 12/2009 | | B01D 15/00 |
| WO | WO 2010013677 A1 * | 2/2010 | | B01D 19/0031 |
| WO | WO 2010062586 A2 * | 6/2010 | | B03C 1/01 |

OTHER PUBLICATIONS

Dictionary.com, aqueous (Datasheet, Definition, etc.) [online]. Dictionary.com, LLC, Earliest known availability date as evidenced by Archive.org: Oct. 13, 2007 [retrieved on May 12, 2014]. Retrieved from the Internet: <URL: http://dictionary.reference.com/browse/aqueous>.*

Heron, Gorm, Thomas H. Christensen, and Carl G. Enfield. "Henry's Law Constant for Trichloroethylene between 10 and 95 C." Environmental Science & Technology 32, No. 10 (May 1, 1998): 1433-37. doi:10.1021/es9707015.*

Schrick, Bettina, Jennifer L. Blough, A. Daniel Jones, and Thomas E. Mallouk. "Hydrodechlorination of Trichloroethylene to Hydrocarbons Using Bimetallic Nickel-Iron Nanoparticles." Chemistry of Materials 14, No. 12 (Dec. 1, 2002): 5140-47. doi:10.1021/cm020737i.*

Gujer, Willi. Systems Analysis for Water Technology. Springer, 2008.*

Muljadi, Paul. Group 10 Elements., Pedia Press, Jan. 22, 2012.*

Zhang, Jinsong, T. S. Fisher, Jay P. Gore, Debasis Hazra, and P. Veeraraghavan Ramachandran. "Heat of Reaction Measurements of Sodium Borohydride Alcoholysis and Hydrolysis." International Journal of Hydrogen Energy 31, No. 15 (Dec. 2006): 2292-98. doi:10.1016/j.ijhydene.2006.02.026.*

Brewer, G. Daniel. Hydrogen Aircraft Technology. CRC Press, 1991.*

Roth, Jerome A., Srikanth R. Dakoji, Robert C. Hughes, and Robert E. Carmody. "Hydrogenolysis of Polychlorinated Biphenyls by Sodium Borohydride with Homogeneous and Heterogeneous Nickel Catalysts." Environmental Science & Technology 28, No. 1 (Jan. 1, 1994): 80-87. doi:10.1021/es00050a012.*

Dictionary.com, effluent (Datasheet, Definition, etc.) [online]. Dictionary.com, LLC [retrieved on May 21, 2014]. Retrieved from the Internet: <URL: http://dictionary.reference.com/browse/effluent?s=t>.*

Lorenzi, Lorenzo De, Maurizio Fermeglia, and Giovanni Torriano. "Densities and Viscosities of 1,1,1-Trichloroethane with 13 Different Solvents at 298.15 K." Journal of Chemical & Engineering Data 40, No. 6 (Nov. 1, 1995): 1172-77. doi:10.1021/je00022a003.*

General Electric Co., ZeeWeed* 500A/B Module, Fact Sheet (2008).*

General Electric Co., ZeeWeed Membranes for Municipal Drinking Water, Bulletin (2008).*

Strandberg et al., Degredation of Trichlooethylene and trans-1,2-dichloroethylene by a Methanotrophic Consortium in a Fixed-Film, Packed-Bed Bioreactor 23 Environ. Sci. Technol. 1422-1425 (1989).*

Kathy Angleberger & Robert W. Bainer, Not "Just" Pump and Treat, WM'01 Conference 1, 4 (2001).*

Yoneda et al., Hydrodechlorination of para-substituted chlorobenzenes over a ruthenium/carbon catalyst, 84 Appl. Catal. B-Environ. 667, 667-677 (2008).*

Liu et al., Effect of TCE Concentration and Dissolved Groundwater Solutes on NZVI-Promoted TCE Dechlorination and H2 Evolution, 41 Environ. Sci. Technol. 7881, 7881-7887 (2007).*

Hennebel et al., Biocatalytic dechlorination of hexachlorocyclohexane by immobilized bio-Pd in a pilot scale fluidized bed reactor, 9 Environ. Chem. Lett. 417, 417-422 (2010).*

Hutchins et al., Reduction of Tertiary Halides to Hydrocarbons with Sodium Borohydride in Sulfolane, 36 J. Org. Chem. 1568 (1971). (Year: 1971).*

Bell et al., The Reduction of Organic Halogen Compounds by Sodium Borohydride, 34 J. Org. Chem. 3923, 3923-3926 (1969). (Year: 1969).*

Cindy G. Schreier and Martin Reinhard, Catalytic Hydrodehalogenation of Chlorinated Ethylenes using Palladium and Hydrogen for the Treatment of Contaminated Water, 31 Chemosphere 3475, 3475-3487 (1995). (Year: 1998).*

Liu et al., Effect of TCE Concentration and Dissolved Groundwater Solutes on NZVI-Promoted TCE Dechlorination and H2 Evolution, 41 Environ. Sci. Technol. 7881, 7881-7887 (2007). (Year: 2007).*

L.L. Berg, Explanation of Significant Differences for the Trailer 5475 Ground Water Remediation, UCRL-AR-136189, 1-10 (2000). (Year: 2000).*

(56) References Cited

OTHER PUBLICATIONS

L.L. Berg et al., Remedial Design Report No. 4 for the Trailer 5475 Treatment Facilities, UCRL-AR-126014, 1-118 (1998). (Year: 1998).*
Irwin M. Hutten, Handbook of Nonwoven Filter Media 306 (2007). (Year: 2007).*
Ozlem Keskin-Ozkaya, Conversion and Reactor Sizing 1-20 (n.d.).*
Strandberg et al., Degredation of Trichloroethylene and trans-1,2-Dichloroetyhlene by a Methanotrophic Consortium in a Fixed-Film, Packed-Bed Bioreactor, 23 Environ. Sci. Technol. 1422, 1424 (1989). (Year: 1989).*
W. H. Dennis, Jr. & W. J. Cooper, Catalytic Dechlorination of Orgnaochlorine Compounds. I. DDT, 14 B. Environ. Contam. Tox . 738, 740-741 (1975). (Year: 1975).*
Fogler et al., Elements of Chemical Reaction Engineering 596-610 (1st ed., 2000). (Year: 2000).*
Harry Silla, Chemical Process Engineering: Design and Economics 336 (2005). (Year: 2005).*
Heron et al., Henry's Law Constant for Trichloroethylene between 10 and 95 °C, 32 Environ. Sci. Technol. 1433, 1435 (1998). (Year: 1998).*

A. Monnier et al., Cooperative Formation of Inorganic-Organic Interfaces in the Synthesis of Silicate Mesostructures, Science, Sep. 3, 1993, pp. 1299-1303, vol. 261.
Shaily Mahendra et al., Indentification of the Intermediates of in Vivo Oxidation of 1,4-Dioxane by Monooxygenase-Containing Bacteria, Environmental Science & Technology, 2007, pp. 7330-7336, vol. 41 No. 21, American Chemical Society.
Rosa María Félix-Navarro et al., Kinetics of the Degradation of 1,4-Dioxane Using Persulfate, J. Mex. Chem. soc., 2007, pp. 67-71, Sociedad Química de México, Tijuana, Baja California.
Lauren K. Wolf & C&EN Washington, Sweating the Small Stuff: Concerns Grow Over Nanoparticle Characterization and Purity, Science & Technology, May 28, 2012, pp. 48-50.
Search Report issued in corresponding International Application No. PCT/US2013/025650 dated May 10, 2013.
Office Action issued in corresponding U.S Appl. No. 13/764,760 dated Jul. 17, 2014.
Search Report issued in corresponding International Application No. PCT/US2014/028357 dated Jul. 28, 2014.

* cited by examiner

METHOD FOR DESTRUCTION OF REDUCIBLE CONTAMINANTS IN WASTE OR GROUND WATER

CROSS REFERENCE TO RELATED APPLICATIONS

This patent application is a continuation-in-part application of commonly owned U.S. patent application Ser. No. 13/764,760 entitled "APPARATUS FOR THE USE OF NANOPARTICLES IN REMOVING CHEMICALS FROM AQUEOUS SOLUTIONS WITH SUBSEQUENT WATER PURIFICATION" that was filed on Feb. 11, 2013. patent application Ser. No. 13/764,760 is incorporated by reference in its entirety herein. patent application Ser. No. 13/764,760 claimed priority under 35 U.S.C. § 119(e) of U.S. Provisional Patent Application No. 61/597,836, filed Feb. 12, 2012, entitled "APPARATUS FOR THE USE OF NANO-PARTICLES IN REMOVING CHEMICALS FROM AQUEOUS SOLUTIONS WITH SUBSEQUENT WATER PURIFICATION," the contents of which are incorporated herein by reference in their entirety.

FIELD OF THE DISCLOSURE

The present invention is directed to a water purification apparatus configured to use a wide variety of colloidal particles and nanoparticles to remove chemicals from water with subsequent purification of the water beyond the chemicals removed. More particularly, the apparatus collects the nanoparticles, or enables the nanoparticles to be easily collected, for recovery of the chemical such that the particles can be reused. The apparatus can accommodate a wide range of reaction times, particle and chemical concentrations and can be automated such that the apparatus operates in a fed batch mode to continuously purify the source aqueous solution.

This subject matter of this continuation-in-part generally relates to the destruction of certain chemicals, such as those from the processes of the disclosed apparatuses, and more particularly relates to the destruction of certain chemicals by reduction with a hydride and catalyst in a reactor.

BACKGROUND OF THE DISCLOSURE

The task of removing chemicals from aqueous solution, especially when they are present at low concentration, has been a commercial engineering problem for many years. This has been one of the main problems in making biotechnology commercially effective for a wide array of products. These problems commonly contribute to the high cost of remediating water contaminated with toxic materials or materials that could be recycled and reused if collected from the water.

In a chemical process, the separation and purification of the desired chemical in the aqueous phase can easily reach 40% of the cost of the chemical production even after all filterable solids are removed from the solution. The cost is higher the lower the concentration of produced chemical. In the process of removing a contaminant from water, it can be the bulk of the cost.

Conventionally, resin beds using absorbent resins are frequently used for chemical separations. In this technology, the highly filtered aqueous solution is pushed under pressure through a bed of resin wherein the resin adsorbs the chemical. The chemical is then washed off the bed by another solution in a more concentrated form. The flow through the bed must be uniform and precise and the system requires considerable hydraulic pressure. The resin beads are usually on the order of 100 micrometers or so and do not have the high surface area of a colloidal particle bead or nanoparticle bead. If the particles are made too small, the pressures needed may be excessive.

In the case of remediation technology, expensive resins are not usually the choice. Activated carbon filters commonly are used and the carbon with contaminant is collected and subsequently burned in hazardous waste incinerators.

The use of nanoparticles for the adsorption of chemicals has been proposed for many years. Although recently renamed "nanotechnology", small particle chemistry has been known from the mid 19th century and in the 20th century these types of particle were included in the class of physical state covered by the discipline known as "colloid chemistry" or "colloid science". By either name, a common difficulty has always been the manipulation of particles that are difficult to handle, difficult to see and collect, and potentially hazardous in their dry and dusty state. See, e.g., "Separation and purification techniques in biotechnology" by Frederick J. Dechow, Reed & Carnrick Pharmaceuticals, Piscatawy, N.J., Noyes Publications, Park Ridge, N.J., 1989; "Biochemical Engineering" by James M. Lee, Washington State University, Prentice hall, Englewood Cliffs, N.J., 1992; and "Separation, Recovery, and Purification in Biotechnology Recent Advances and Mathematical Modeling" by Juan A. Asenjo, EDITOR Columbia University, Juan Hong, EDITOR, Institute of Technology, Developed from a symposium sponsored by the Division of Microbial and Biochemical Technology at the 190th Meeting of the American Chemical Society, Chicago, Ill., Sep. 8-13, 1985, American Chemical Society, Washington, D.C. 1986, the entire contents of which are incorporated herein by reference in the entirety.

The higher surface area of such particles makes them a great candidate for improved separation and purification processes; however, their use has been extremely limited to date.

Reduction of Contaminants

In reclamation efforts it is often necessary to reduce the levels of contaminants in liquids for any number of reasons, including meeting discharge standards or preparing the liquid for reuse. It can be particularly costly to reduce concentrations of chlorinated hydrocarbons, metals and certain other contaminants.

Air stripping, for instance, is a previously disclosed method for treating chlorinated solvents in water. This process involves blowing air through contaminated water, by which the solvents in the water are rendered airborne. The airborne solvents can then be captured, such as by carbon filters, for later disposal or destruction by proper means. The use of aeration, carbon filters, and the need for disposal make this process time consuming and expensive. The treatment of metal contaminants is currently much more difficult than organic solvents, requiring ion exchange treatment or chemical transformation to forms that can be collected by filtration.

Hydrogenation can be an effective way by which to reduce numerous contaminants, such as chlorinated solvents and metals. Unfortunately, normal hydrogenation using gaseous hydrogen usually takes place at high temperatures (up to 400° C.) and high pressures (up to 5,000 psig or 341 atm). The vessels required for such hydrogenation are expensive and the process is relatively dangerous. However, several decades ago it was found that certain inorganic compounds such as $NaBH_4$, $CaH_2$, $KBH_4$, $LiAlH_4$ (collectively called hydrides) were capable of reducing various compounds by hydrogenation in less severe conditions than that required for hydrogen gas. The disclosed method uses hydrides to reduce the concentration of certain contaminants in liquids.

The subject matter of the present disclosure is directed to overcoming, or at least reducing the effects of one or more of the problems set forth above.

BRIEF SUMMARY OF THE DISCLOSURE

These problems and others are addressed by the present invention, an exemplary embodiment of which comprises an apparatus that is configured to use a wide array of nanoparticles as adsorbent or absorbents. The apparatus allows for complete mixed contact with the aqueous solution being treated, allows for easy removal of the particles with no risk of the particles remaining in the purified water and provides for easy and continuous automated operation. The apparatus is also designed such that any level of purification of the water can be achieved including dissolved solids that are not collected by the particles but are still undesirable for using the water after removal of the target chemicals.

Exemplary embodiments of the apparatus can use solid particles made of a uniform substance or coated particles including, for example, particles with magnetic cores that have recently been described in the conventional art. Although the same apparatus or other exemplary apparatus can also handle larger particles, an exemplary embodiment is configured for particles in the range of smallest useful particles around 0.2 micrometers.

Other features and advantages of the present invention will become apparent to those skilled in the art upon review of the following detailed description and drawings.

Reduction of Contaminants

Disclosed also is a method of reducing the concentration of a contaminant in a solution by chemically reducing and destroying it. An amount of contaminated water is charged into a reactor. A catalyst and then a hydride are added to the reactor and the mixture allowed to react for a period. The reaction can be assisted by mixing. Depending on the amount and composition of the targeted contaminant, hydride can be added to the reactor continuously or in batches until a desired concentration is reached.

The disclosed subject matter presents several possible advantages. First, a wide variety of organic and inorganic materials can be destroyed. For instance, chlorinated hydrocarbons, metals and other contaminants can be chemically reduced to more benign forms. Only simple equipment is required and the method can be accomplished in a reasonable time period. The method is relatively inexpensive in relation to other comparable reduction methods. Powdered reagents can optionally be utilized. Another advantage is that the reaction conditions involved can be comparatively mild to other methods, such as hydrogenation with the use of gaseous hydrogen. Generally, the method performs admirably at relatively low pressures (below 100 psig (7.8 atm) and at ambient or slightly elevated temperatures.

The details of one or more embodiments of the invention are set forth in the accompanying drawings and descriptions below. The foregoing summary is not intended to summarize each potential embodiment or every aspect of the disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Reduction of Contaminants

DETAILED DESCRIPTION OF THE DISCLOSURE

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
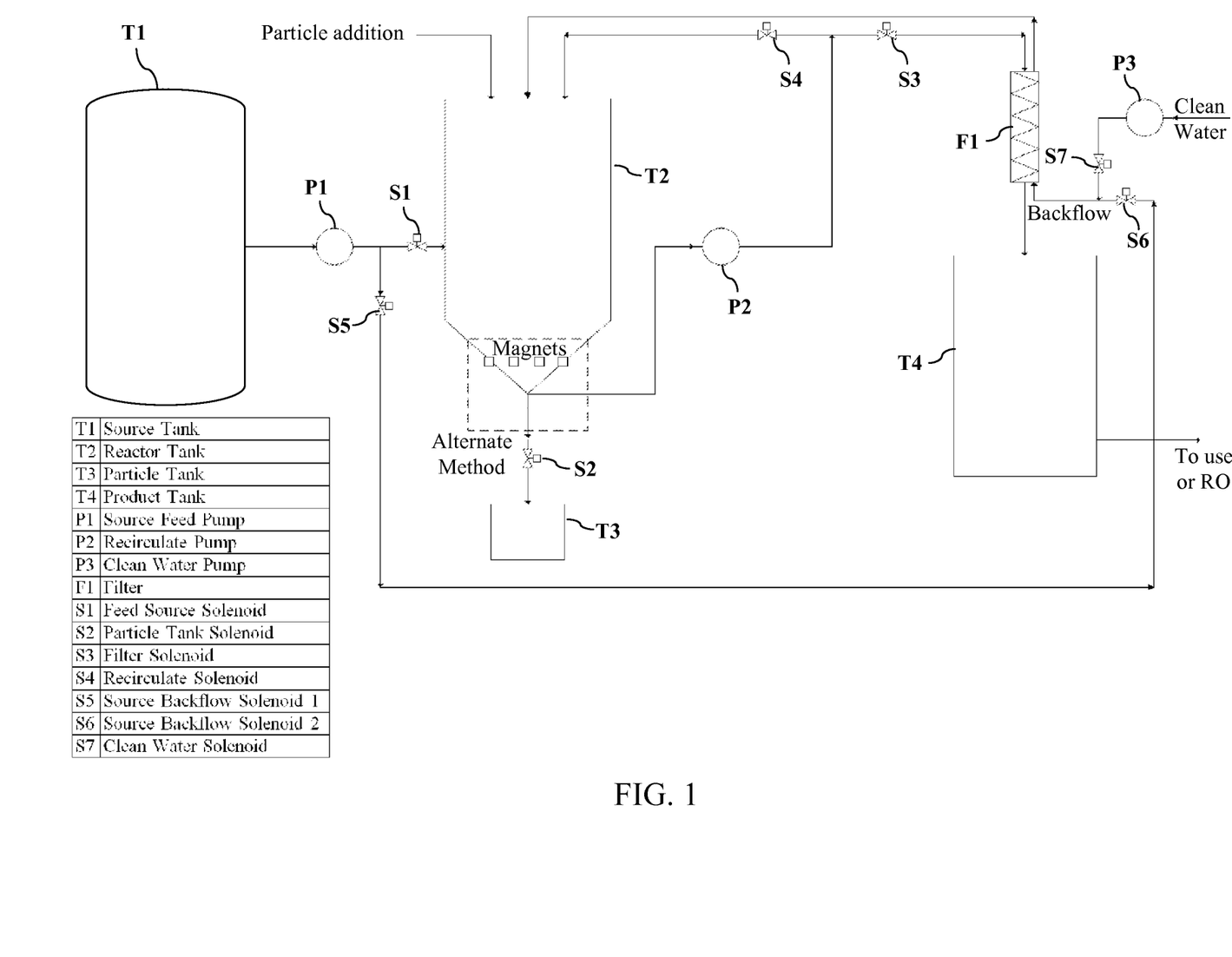
FIG. 1 is a schematic flow diagram illustrating an apparatus according to an exemplary embodiment of the invention.
Figure 2:
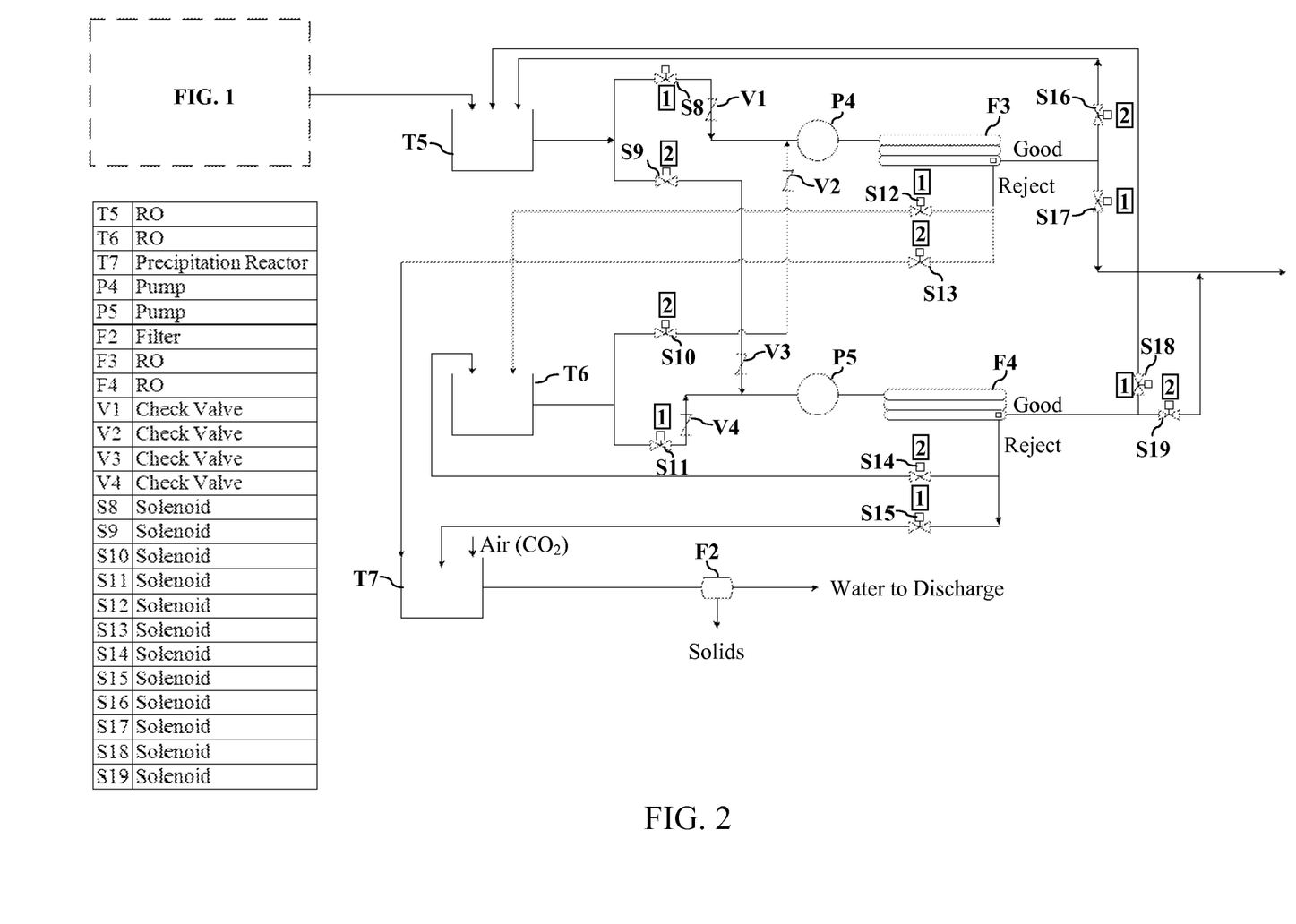
FIG. 2 is a schematic flow diagram illustrating an apparatus according to another exemplary embodiment of the invention.
Figure 3:
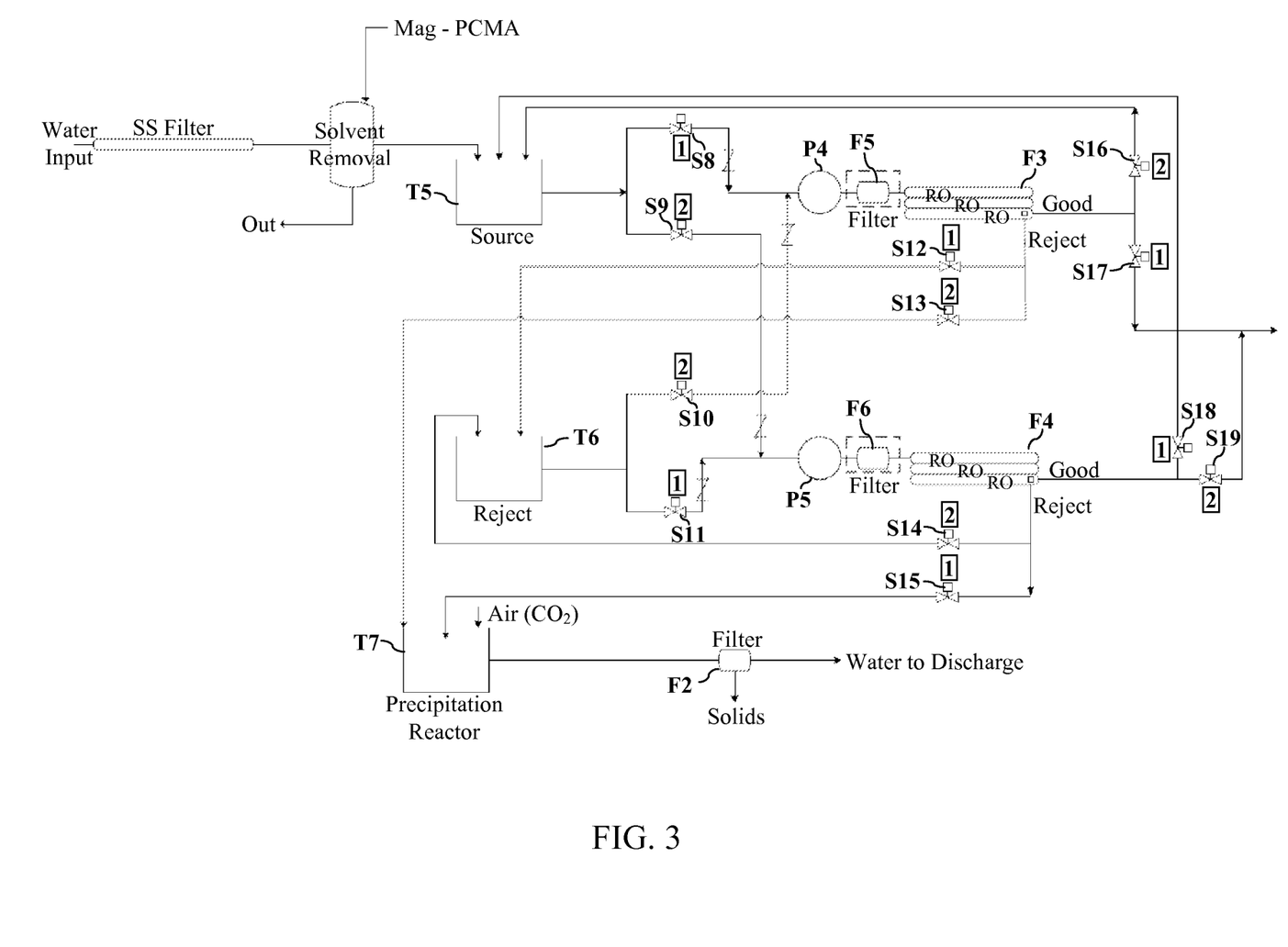
FIG. 3 is a schematic flow diagram illustrating an apparatus according to another exemplary embodiment of the invention.

With reference to FIGS. 1-3, exemplary embodiments of a water purification apparatus configured to use a wide variety of colloidal particles and nanoparticles to remove chemicals from water with subsequent purification of the water beyond the chemicals removed, and method of water purification, will now be described.

FIG. 1 illustrates an example of part of an exemplary embodiment of the apparatus that relates to handling the particles and removal of the chemical of interest. FIGS. 2 and 3 illustrate examples of another part of an exemplary embodiment of the apparatus that uses the produced water from FIG. 1 at the same required hydraulic flow to further purify the water for subsequent use. The example embodiments in FIGS. 1-3 can be used in combination with each other or separately on their own.

The particles or absorbents are designed to remove a known amount of the chemical of interest. The particles may be used several times before they are saturated and are removed to collect the chemical and either be reactivated or replaced with activated particles.

With reference to FIG. 1, an example of the flow for a single cycle before the replacement cycle is as follows.

The aqueous solution that contains the chemical of interest (target chemical or chemicals) is fed from Tank T1 through Pump P1 to solenoids (or valves) S1 and S5. When S1 is opened (S4 is closed), the aqueous solution flows into the treatment Tank T2. When S5 is opened (S1 is closed), the aqueous solution flows toward S6 where it can be used to back flush particles off Filter F1 to begin the next cycle of treatment. Since in the last cycle fresh water (water without the chemical of interest) will be used to flush the filters, S6 can be closed so that S7 can be opened and Pump P3 can be used to drive the particles back into T2.

In Tank T2, the aqueous solution with the target chemical or chemicals is reacted with the adsorbent particles for a predetermined period of time. In this example embodiment, the reactions time is based on the chemical kinetics of the adsorption process. The kinetics can be based on one or more of the design of the adsorbent, the concentration of the target chemical (or chemicals), the concentration of the adsorbent, the temperature and the mass transfer coefficient based on the mixing of the particles and the solution. A large advantage for this process occurs due to the fact that the mixing by circulation of the particles and the solution using Pump P2 with S4 open (S3 closed) confers a larger mass transfer (enhanced kinetics) over passing the solution through a bed of the same particles. Typical reaction times range from 1-2 minutes up to 45-60 minutes.

The kinetics can be based on the desired reduction in the concentration of the target chemicals in the aqueous solution. In a typical example, the initial concentration will range from a few milligrams per liter (mg/L) up to several percent in the solution and the final concentrations will be in the micrograms per liter (m/L). For example, a contaminant in water may be 100 mg/L and it may be reduced to less than 5 μg/L to comply with water quality standards while a chemical produced by fermentation may be several percent in a solution and reduced to 10-50 mg/L during practical reaction times.

After the completion of a cycle achieving the desired reduction in the planned time, S4 is closed, S3 is opened, and the mixture flows through Filter F1 into product Tank T4. In an example, F1 can be a nanofilter or microfilter. In other examples, the filter materials can be fritted stainless steel or engineered plastic fiber. The pore size depends on the particles sizes. In the case of most nanoparticles, the pore size will be 0.1-0.2 μm typical of the size used for microbial filter sterilization.

The product in Tank T4 has been depleted of the target chemical or chemicals but there still may be other materials in the solution such as inorganic and organic ions comprising the total dissolved solids (TDS) of the solution that make the depleted solution unfit for higher value uses. The solution can then be treated according to the example embodiment described below.

After the last cycle, when the particles are saturated, the particles can be back flushed off the filter by using a small amount of clean water and collecting the particles in the bottom of Tank T2. To perform the final back flush, S7 is opened while S6 is closed. Pump P3 is used.

The final collection of particles can be augmented, for example, with "magnetic capture" in the case of adsorbent particles with a magnetic core. When it is desired to capture particles either after each cycle or at the end of a series of cycles leading to particle saturation, a magnet, or a series of electromagnets, can be activated. These will contain 60-99% of the particles such that the back flushing of F1 is much easier. In either case of collection of the particles after saturation, the particles can be recovered into Tank T3 by opening S2. A small amount of clean water can be used to flush Tank T3. The particles may be reactivated through removal of the target chemical by solvent extraction into a very concentrated, easily purified solution. The particles can then be added back to Tank T2.

Many contaminated water or aqueous streams from biological processes such as fermentation contain high levels of TDS and would not be usable in industrial or commercial applications even after the removal of the target chemicals. For example, industrial and commercial operations use a large amount of "cooling" water in cooling towers and other systems. Water from a process such as the manufacture of organic acids via fermentation would still not be suitable for use in a cooling tower even if all the product organic acid was removed.

With reference to the example illustrated in FIG. 2 (and similarly shown in the example illustrated in FIG. 3), the Tank 5 can receive as one stream the input water from Tank T4 in the example illustrated in FIG. 1. There are two coupled systems of solenoids in the example illustrated in FIG. 2. Solenoid System 1 contains solenoids S8, S10, S12, S15, S17 and S19. Solenoid System 2 contains solenoids S9, S11, S13, S14, S16 and S18. All solenoids of Solenoid System 1 are open when those of Solenoid System 2 are closed. All solenoids of Solenoid System 2 are open when those of Solenoid System 1 are closed.

When Solenoid System 1 is open the output of Tank T5 is pumped by Pump P4 into Reverse Osmosis Membranes (RO) F3. The produced water is directed as a portion of the total water product stream to the final use while the reject is directed to Tank T6. With Solenoid System 1 still open the water from Tank T6 is pumped by Pump P5 into Reverse Osmosis Membranes F4. The produced water is sent to Tank T5 and the reject water is sent to Tank T7 where calcium carbonate can precipitate when the calcium ion content of the total rejected water reaches 55 to 85 mg/L depending on the pH. This precipitation is enhanced as T7 is an open tank with mixing of carbon dioxide from the air which at pH above 7.8, preferably at 8.3, is enough in the carbonate form to cause precipitation. As shown in FIG. 3, an optional filter F5 can be provided between Pump P4 into Reverse Osmosis Membranes F3 and an optional filter F6 can be provided between Pump P5 and Reverse Osmosis Membranes F4.

The system is run in the above configuration for a short enough period of time (10-30 minutes depending on water quality) such that kinetics do not favor the precipitation of materials on the membranes in F4. After this period of time, Solenoid System 1 is closed and Solenoid System 2 is opened. This effectively switches the position of the two Reverse Osmosis Membrane modules to further protect the second set. The water from Tank T5 now flows through Pump P5 to F4. The high quality water produced at F4 is the other portion of the total water product stream while the reject goes to Tank T6. In this configuration, the water from T6 is fed by Pump P4 to F3. The produced water from F3 goes to Tank T5 while the reject goes to Tank T7. This completes the switching cycle wherein the next cycle can begin.

Since the water in T7 may contain solid precipitated calcium carbonate, the solids are collected by Filter F2 before the total reject is discharged.

The following are several, non-limiting examples of a process of using the exemplary embodiments illustrated in FIGS. 1-3.

In one example, the part of the apparatus diagrammed in FIG. 1 was operated with a methyl orange solution at a concentration of 100 mg/L to remove the methyl orange. Nanoparticles with a magnetic iron core and a silicate coating containing a positively charged ion when immersed in solution (3-(trimethoxysily)propyl-octadecyldimethyl-ammonium chloride) were used. The nanoparticles were designed to be able to remove 112 mg/L of methyl orange using a 5 gram/L concentration of particles in 45 minutes. It was determined that a concentration of 1.8 grams/L would remove 100 mg/L in less than two hours. Tank T2 was operated at a working volume of 10 Liters and 18 grams of particles were added. 10 liters of the methyl orange solution were sent to T2 and it was determined that the methyl orange was removed to non-detectable levels in 2 hours. The particles were collected for reuse. In this case, four (4) electromagnets were used to assist particle collection and they were able to collect 70% of the particles while F1 collected the remaining particles.

In an example, an apparatus according to the exemplary embodiments illustrated in FIGS. 2 and 3 was configured with the approximate flow rate through the system of 2 gallons per minute. Used water with a TDS of 800 mg/L was converted to water with 40 mg/L TDS with a reject of only 15% of the input water.

The example apparatus diagrammatically illustrated in FIG. 2 (and similarly in FIG. 3) was used with water of 400 mg/L. The purpose of this trial was to make water that contained less than 6 mg/L of TDS for use as very high quality reagent water. The system was used in dual pass mode (using the produced water from one pass to go through again) and water with <6 mg/L of TDS was obtained with 25% reject.

Exemplary Pilot Test

With reference again to FIGS. 1-3, an example of a pilot test conducted according to the invention will now be described.

To summarize, in this example pilot test, an exemplary treatment device according to the invention was used to remove 1,4-dioxane and 1,1-dichloroethene from water extracted from an active site. The test used 120 liters of water over 30 cycles of operation of the pilot equipment. The dioxane and DCE were both removed to non-detectable limits (<2 ppb) from the samples of water analyzed after 10, 20 and 30 cycles. The pilot unit can be scaled up and automated for testing at the site at an average flow of one gallon per minute.

Introduction of Pilot Test:

Previous laboratory tests conducted by Applicants had shown that the Ti-PCMA particles or the Fe-PCMA could remove DCE and dioxane. Based on previous small samples, a recognition and determination was made that a loading of 25 grams per liter of the particles should remove up to 100 ppb of DCE and 50 ppb of dioxane for at least 30 cycles of exposure of the particles to the contaminated water.

The exemplary laboratory pilot unit of the example treatment device has an approximately 5 gallon reactor and is set up corresponding to the attached diagram. The contaminated water is pumped into the reactor where it contacts the particles. The particles and water are circulated for a predetermined time to insure that the levels of the contaminants in the water fall below maximum contaminant level ("MCL"). The water is then separated from the particles by a microporous filter and the particles returned to the reactor for the next aliquot of water to be treated.

A purpose of the tests using site water was to validate the laboratory findings about the kinetics and the cycle timing.

Results and Discussion of Pilot Test:

Samples of the site water were taken from drums that were received and tested for DCE and dioxane. The GC-MS analysis determined that the concentration of DCE was 39.5 ppb and dioxane was 57.9 ppb.

The test was begun by mixing 4 liters of the site water with 110 grams of the Ti-PCMA particles in the reactor. An extra 10% of particles was used to allow for some lack of total removal from the filter during subsequent filtration steps. Referring to FIGS. 1-3, pump P2 was then turned on and the mixture allowed to circulate from the tank through the pump P2 and back into the tank for 10 minutes. At this time the valves were changed such that pump P2 pumped the mixture through the filter F1. The produced water was collected in T4 and the first sample (zero time) was taken for analysis.

The filter used in this exemplary test was a sintered stainless steel hollow tube filter with a surface area of 365 cm$^2$ (0.0365 m$^2$). The particles were collected on the outside of the filter between the filter surface and the housing. When the flow is reversed to push the particles back into the tank, the water flows through the center of the filter to the housing.

The lines in the laboratory unit are ¼" tubing and the pump took 1.5 to 2 minutes to discharge into the filter. At this point P2 is stopped, P1 is turned on to backflush the particles from the filter back into the reactor. The valves are changed and the rest of the 4 liters is added from the source tank T1 to the reactor T2. The filling cycle is also 1.5 to 2 minutes. An entire cycle is therefore about 14 minutes making the average flow rate of this system 286 ml/minute. The flow rate of the two diaphragm pumps was 2 to 2.7 liters/minute.

This process was repeated 30 times with samples being taken after 10, 20 and 30 cycles. No DCE or dioxane was detected. The instrument had previously shown discernable peaks at levels of 1.7 and 1.9 ppb for these contaminants.

There was no observed degradation of the particles using these pumps over the course of the experiment. The actual longevity of the particles was not a part of this test.

Conclusions of Pilot Test:

After 30 cycles the levels of DCE and dioxane in the site water were reduced to below 2 ppb. The test was not run until exhaustion of the particles. Based on the previous laboratory studies, however, the present invention recognizes and estimates that 50 cycles will be possible before the particles have to be treated to remove and degrade the DCE and dioxane.

The present invention contemplates scaling the unit up to 1 gallon per minute (3.875 L/min) average flow. Assuming a 15 minute total time for a cycle and circulation of the reactor for 10 minutes, the present invention recognizes that a reasonable amount of time to fill and empty is 2 minutes. In an example, to average 1 gpm over the 15 minute period, the pumps must flow at 7.5 gpm (29 L/min) during the fill and empty cycles.

The present invention recognizes that, in the example pilot test, the scaleup on flow is approximately 100 times but the scale up on the number of particles is only 15. The operating size of the reactor is 15 gallons compared to the approximate 1 gallon (4 liters in this test) in the pilot unit. In the example test, the filter was not limited in any way, and therefore, the present invention recognizes that a total filter surface of 10 times what was used in this example test should be adequate, which includes for example about 0.4 m$^2$. The implication for a full scale unit at 15 gpm would be that 4 m$^2$ of filter is a starting estimate. Experience with the automated system will show if the scale factor can be somewhat reduced. It should also be noted that the stainless steel filter is not the only choice. Other filters and materials such as polymeric microfilters have been provided in the same size range and have been used successfully in RO systems when precipitated CaCO$_3$ was to be eliminated from streams under 120 psi pressure going to the membranes. The smallest of these filters was too large for the laboratory unit but, based on price, one or more alternative filters may be appropriate for the filters for larger units.

To scale up the unit, the next task is to select the other components and program the control system for the solenoids. In an exemplary embodiment, the present invention uses PC technology with typical control boards to allow easy modification, reduce cost and provide for simple interfacing to any desired monitoring of the test unit and ultimately the full size unit.

In an exemplary embodiment, the source and produced water tanks are separate from the reactor unit.

The present invention made several assumptions in the example pilot tests. For example, the following are the current assumptions. The reactor tank will be 25 gallons to allow plenty of headspace and the potential for testing slightly increased rates. The system will be skid mounted on a doublewide skid. The system will be protected with the minimum of a roof and electrical connections will be available. Since the pumps are expected to be diaphragm pumps operating by a small air compressor, the total AC power will be determined by the requirements of the control system plus the compressor (to be determined).

The main unresolved part of the system in the removal of the particles (from T3 in FIGS. 1-3) and the introduction of fresh particles (from T5 in FIGS. 1-3). In the example, the frequency of the removal, treatment and recycling will determine the sizes of these tanks and solenoids. The total height of the unit is determined by the sum of T2, T5 and T3 assuming gravity feed for the system. Due to this becoming a factor as the system is scaled, the present invention recognizes that further conical bottom tanks for T5 and T2 with a width to height ratio of 3:1 may be a beneficial choice.

One of ordinary skill in the art will recognize that other tests can be performed based on, for example, the exemplary embodiments illustrated herein and the present invention is not limited to the exemplary pilot test described herein.

To summarize, the exemplary embodiments of the present invention can include an apparatus, and method of using the apparatus, that removes target chemicals from water using particles down to 0.2 micrometers in size. The apparatus can include (a) a source of an aqueous solution of the target chemical that can be supplied on demand to a reaction chamber, (b) a reaction chamber with means for adding and removing a slurry of particles. The reaction chamber also can include a device for recirculating the particles after mixing with the aqueous solution of the target chemical. The apparatus further includes (c) a device or component for timing the reaction between the particles and the target chemical such that the concentration of the target chemical in the aqueous solution reaches a predetermined low level in a desired time, (d) a device or component for removing the aqueous phase from the reactor while keeping the particles entrained inside the reactor using a microfilter that can be back flushed, (e) a device or component adding more aqueous solution to the reactor from the source and continuing the cycles until the particles are saturated, (f) a device or component for removing and replacing the particles in the final cycle of the particle charge lifetime, and (g) a device or component for recovering the target chemical from the particles such that the particles can be reused.

The apparatus can include one or more magnets that are installed to collect particles with magnetic cores in (d) and (f).

The microfilter back flushing during intermediate timed cycles before the final particle collection can be performed with source solution from the aqueous source containing the target chemical.

In an exemplary embodiment, the microfilter can be fritted stainless steel. In another exemplary embodiment, the microfilter can be formed polymeric material such that the flow of particles is along the center of the filter and the flow of collected water is radially out through the polymeric layer to collection of the water.

In an exemplary embodiment, the produced water from (d) flows into a dual stage reverse osmosis system wherein the reject from one stage is sent to a second stage and the stages are switched to coincide with the timing of the particle cycles in (d).

In an exemplary embodiment, the second stage reject water from the dual stages is combined with carbon dioxide from the air to react with calcium ions in the water to maintain acid-base balance and create calcium carbonate for disposal in the final reject water along with other ionic species that bind to calcium carbonate.

Another exemplary embodiments include a method of using the apparatus that removes target chemicals from water using particles down to 0.2 micrometers in size. The method includes (a) supplying a source of an aqueous solution of the target chemical on demand to a reaction chamber, (b) adding and removing a slurry of particles using a reaction chamber. The method can include recirculating, using the reaction chamber, the particles after mixing with the aqueous solution of the target chemical. The method further includes (c) timing the reaction between the particles and the target chemical such that the concentration of the target chemical in the aqueous solution reaches a predetermined low level in a desired time, (d) removing the aqueous phase from the reactor while keeping the particles entrained inside the reactor using a microfilter that can be back flushed, (e) adding more aqueous solution to the reactor from the source and continuing the cycles until the particles are saturated, (f) removing and replacing the particles in the final cycle of the particle charge lifetime, and (g) recovering the target chemical from the particles such that the particles can be reused.

The method can include magnetically collecting particles with magnetic cores in (d) and (f) using one or more magnets.

The microfilter back flushing during intermediate timed cycles before the final particle collection can be performed with source solution from the aqueous source containing the target chemical.

In an exemplary embodiment, the microfilter can be fritted stainless steel. In another exemplary embodiment, the microfilter can be formed polymeric material such that the flow of particles is along the center of the filter and the flow of collected water is radially out through the polymeric layer to collection of the water.

In an exemplary method, the produced water from (d) flows into a dual stage reverse osmosis system wherein the reject from one stage is sent to a second stage and the stages are switched to coincide with the timing of the particle cycles in (d).

In an exemplary method, the second stage reject water from the dual stages is combined with carbon dioxide from the air to react with calcium ions in the water to maintain acid-base balance and create calcium carbonate for disposal in the final reject water along with other ionic species that bind to calcium carbonate.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Reduction of Contaminants

Disclosed is a method to reduce the concentration of a chemical contaminant in a liquid, such as waste or ground water. Contaminated liquid is placed in a reactor where chemical forms of hydrogen can be added without reaction venting. Catalyst and hydride are added to the reactor to destroy the target contaminant. Optionally, the contaminant in the liquid is already bound to the catalyst at the beginning of the process and thus the catalyst is added to the reactor as part of the contaminated liquid. The method allows for chemical reduction under relatively mild conditions, often near or slightly above room temperature and at atmospheric pressure or at slightly elevated pressures.

Multiple additions of hydride can allow a contaminated liquid to be treated until the contaminant concentration is below a desired level. Free phase amounts of contaminants exceeding their solubility in the water can also be present and are destroyed through the reaction process. The disclosed method is suitable for use with the above described apparatus and method. For instance, 1,1-dichlorethene (DCE) and dioxane collected by PCMA nanoparticles can be destroyed using the disclosed method, thus creating a more complete treatment system.

Target contaminants may include chlorinated solvents, metals or other toxic contaminants, including without limitation $CHCl_3$ (chloroform), Trichloroethylene (TCE), Trichloroethane (TCA), Dichlorobenzene (DCB), DCE, dioxane and Cu. Numerous different hydrides are suitable for use in the disclosed method, including without limitation $NaBH_4$, $CaH_2$, $KBH_4$, and $LiAlH_4$. Likewise, different catalysts may be utilized, including Ruthenium on carbon. The catalyst can also be permanently confined micelle array nanoparticles (PCMAs) to which a portion of the contaminant in the liquid is bound. In such a case, the contaminated liquid contains both the contaminant and the catalyst at the beginning of the process, and it is unnecessary to separately add a catalyst to the reactor for the destruction process.

Figure 4:
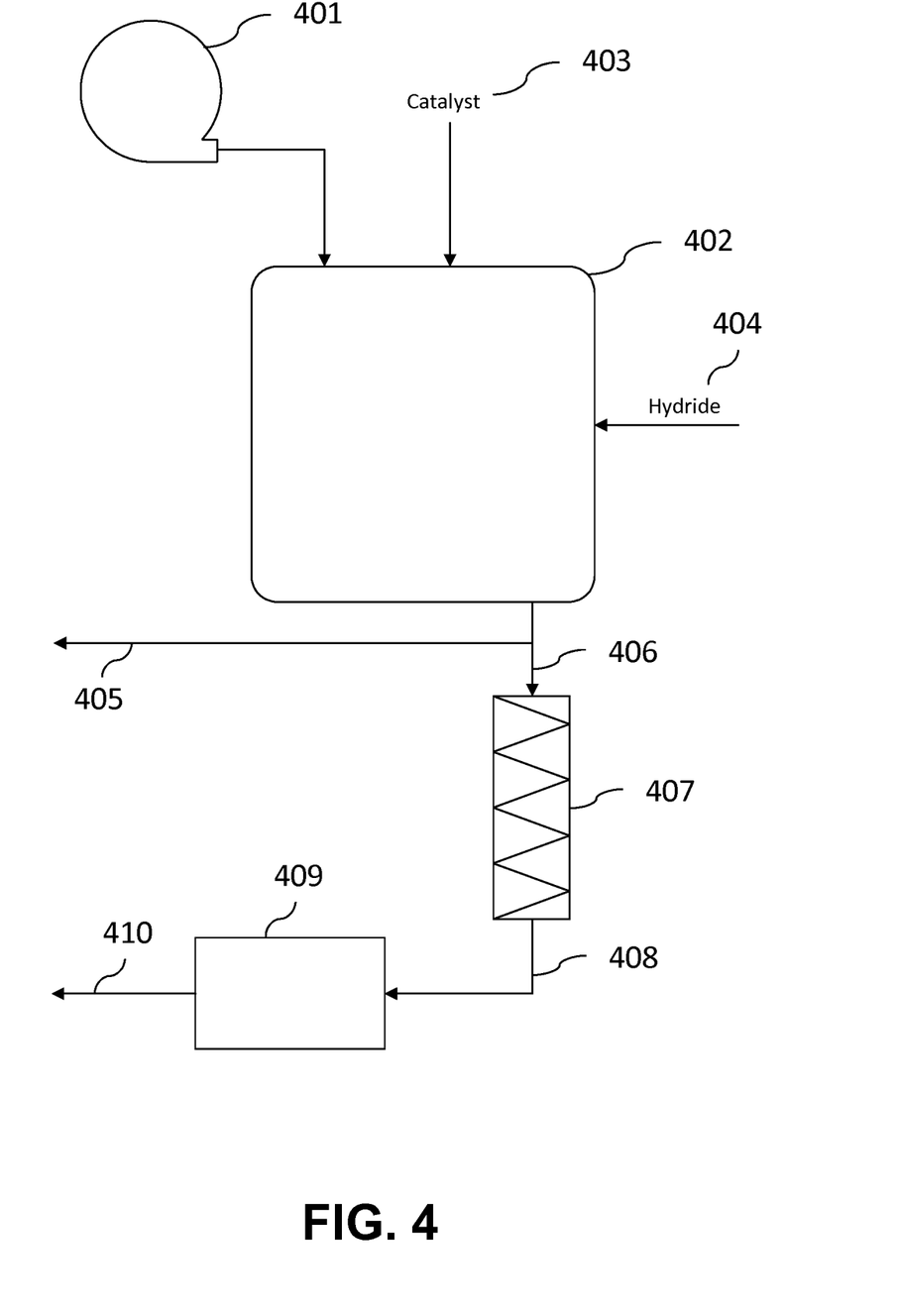
FIG. 4 is a schematic diagram of an apparatus conducting an exemplary embodiment of the disclosed method. The process can be operated either in a batch mode or continuously.

FIG. 4 is a schematic diagram of an apparatus executing an exemplary embodiment of the reduction method. Source of contaminated liquid 401 is connected to reactor 402. Optionally, source 401 can be an outlet of an embodiment of the apparatuses depicted by FIGS. 1-3. When reactor 402 is charged with contaminated liquid, catalyst 403 is added to reactor 402. Next, hydride 404 is added to reactor 402. Optionally, the hydride can be added to the reactor in a container and only released after the reactor is sealed. Hydride 404 reacts with the contaminant in the contaminated liquid, chemically reducing it. After the reaction is complete, the effluent liquid can exit reactor 402 via path 405. The effluent liquid can also exit via path 406, in which case the catalyst is removed from the effluent liquid via removal mechanism 407. Following the collection of the catalyst, the flow follows path 408 and receives polishing ion exchange treatment in unit 409. In that case, the effluent then follows exit path 410. The apparatus can function continuously for some contaminants. In such a continuous process, catalyst 403 resides in the reactor. Contaminated liquid flows into reactor 402 from source 401 at a continuous rate. Hydride 404 is also added at a continuous rate. The effluent of the reaction leaves reactor 402 at an outflow rate equal to the inflow rate of the contaminated water and hydride, thereby maintaining a constant volume of fluid in reactor 402.

Figure 5:
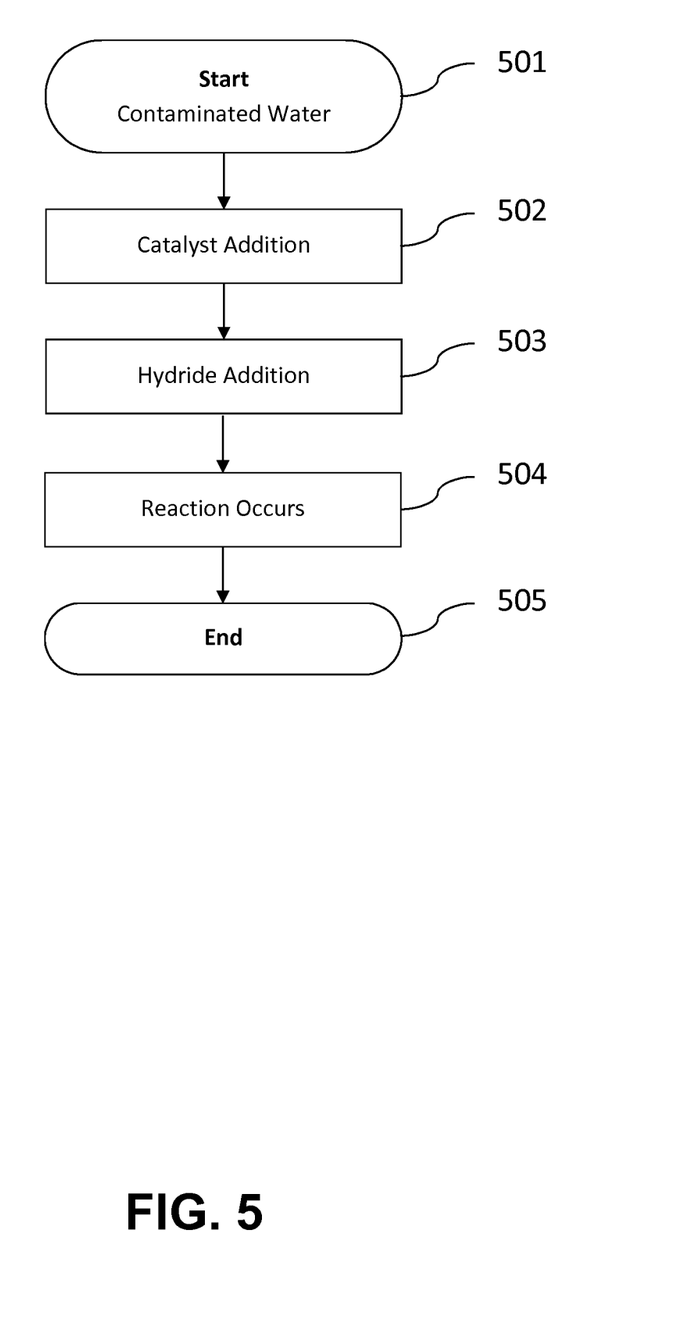
FIG. 5 is a flow chart diagram of an exemplary embodiment of the disclosed method.

FIG. 5 is a flow chart diagram of an exemplary embodiment of the disclosed method, operated in a batch fashion. At starting point 501, a sealable reactor is charged with contaminated liquid. In step 502, an amount of catalyst is added to the reactor. In step 503, an amount of hydride is added to the reactor. In step 504, the hydride reacts with the contaminant in the contaminated liquid with the aid of the catalyst, resulting in some of the contaminant being chemically reduced and destroyed. After a sufficient reaction period, the batch is complete at point 505.

Figure 6:
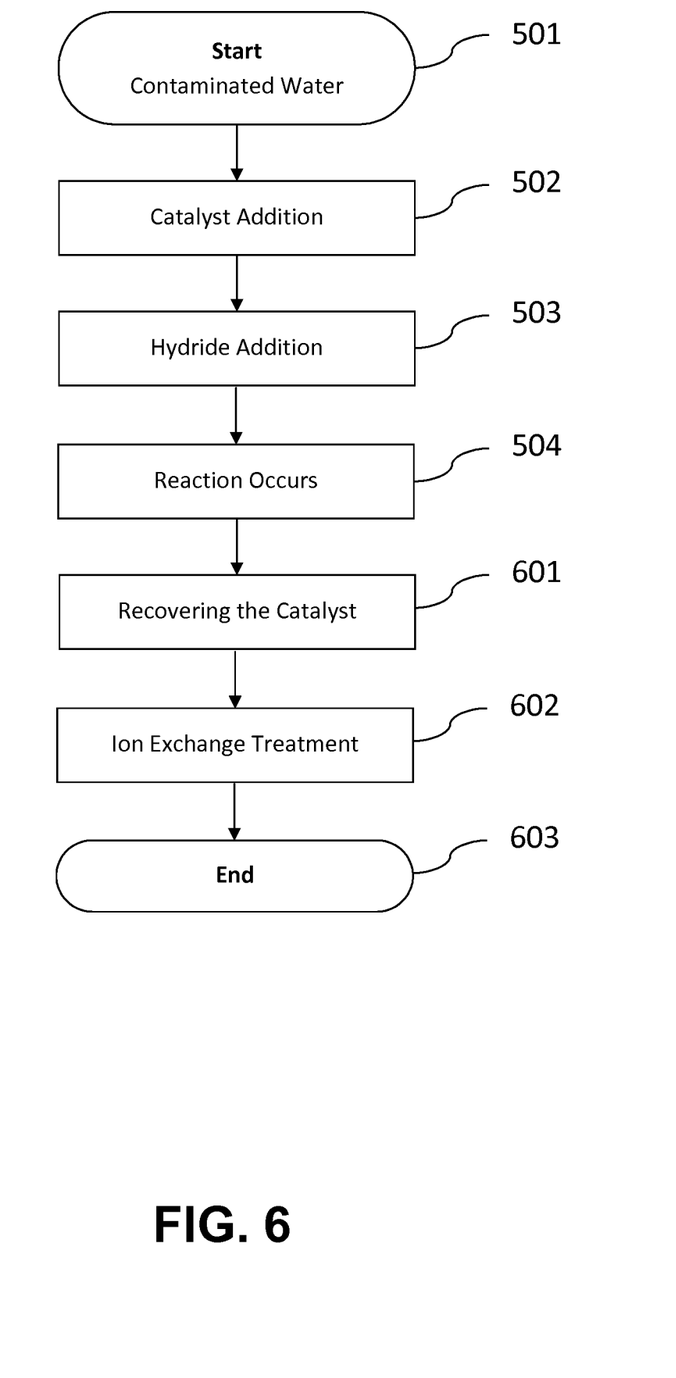
FIG. 6 is a flow chart diagram of an exemplary embodiment of the disclosed method in which post-reaction processing of the effluent is performed.

FIG. 6 is a flow chart diagram of the same exemplary embodiment of FIG. 5, but with several post-reaction processing steps. In step 601, the catalyst added to the reactor in step 502 is recovered is recovered from the effluent of the reaction of step 504. In step 602, the effluent undergoes ion exchange treatment, after which the batch is complete at end point 505.

Figure 7:
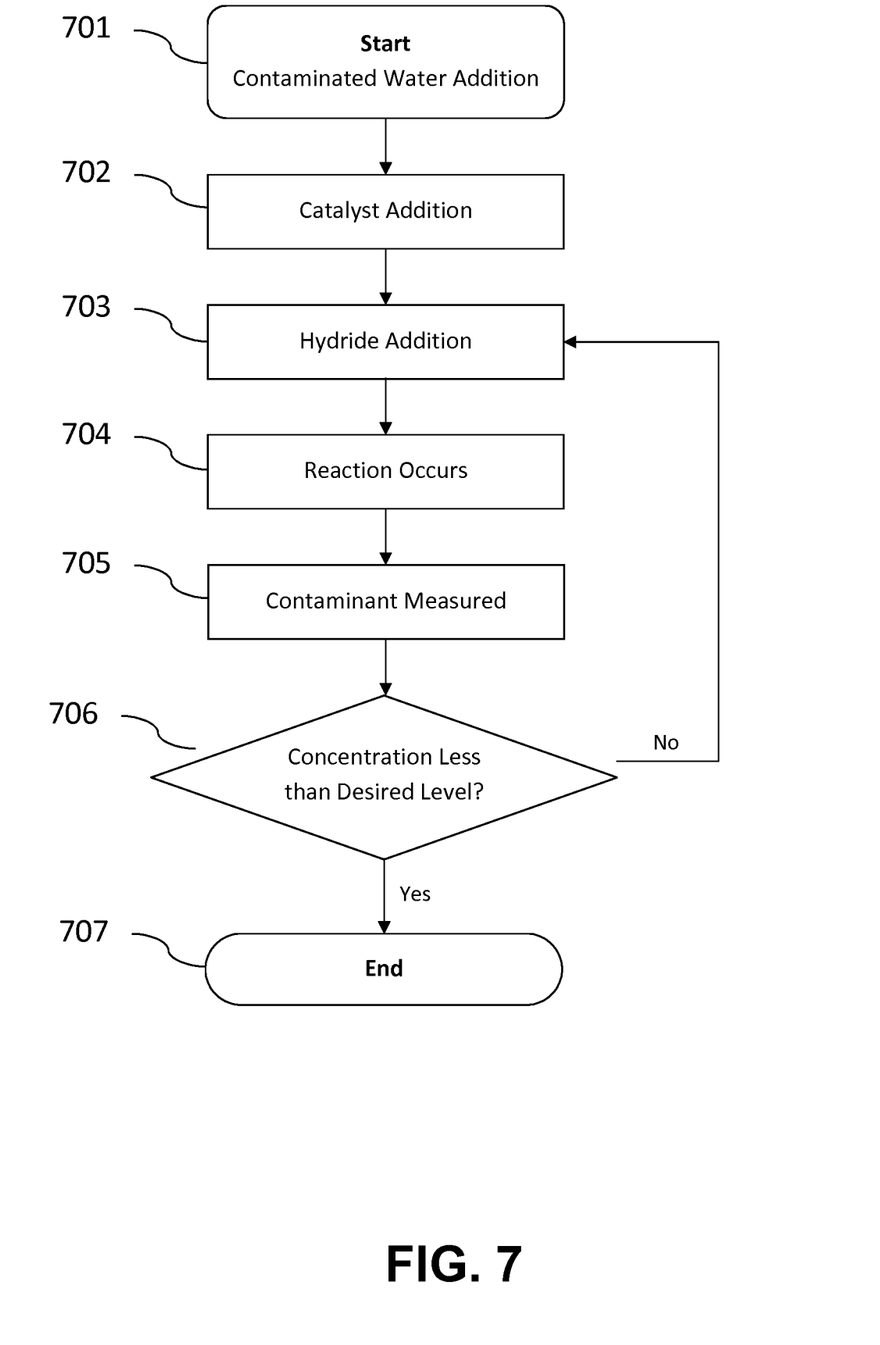
FIG. 7 is a flow chart diagram of an exemplary embodiment of the disclosed method in which additional introductions of hydride are used until the concentration of the contaminant drops below a desired level.

FIG. 7 is a flow chart diagram of an exemplary embodiment in which hydride is added multiple times to reduce the concentration of the contaminant below a desired level. In initial step 701, contaminated water is added to a reactor. In step 702, catalyst is added to the reactor. In step 703, hydride is added to the reactor. In step 704, the hydride reacts with the contaminant in the contaminated liquid with the aid of the catalyst, resulting in a portion of the contaminant being chemically reduced and destroyed. Thus, the concentration of the contaminant in the contaminated liquid is reduced. The concentration of the contaminant remaining in the liquid is measured in step 705. In step 706, that measurement is compared to a desired level. If the concentration is less than the desired level, the effluent is removed from the reactor and the process reaches end point 707. If the concentration is not below the desired level, steps 703, 704, 705 and 706 are repeated until the concentration drops below the desired level.

Figure 8:
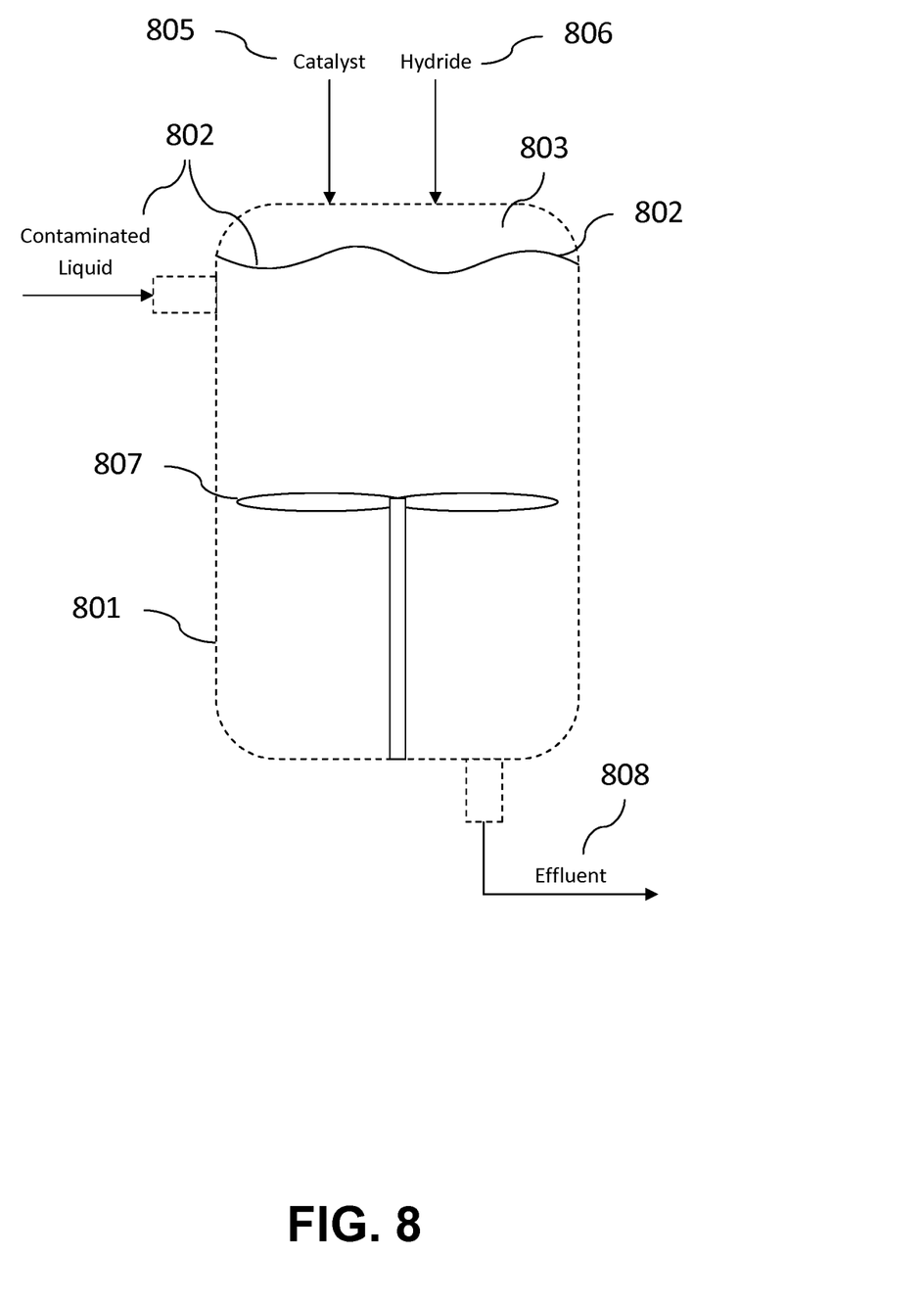
FIG. 8 is an illustrative diagram of the interior of a reactor performing the disclosed method, which there is a headspace and a mixing element.

FIG. 8 is an illustrative depiction of a reactor performing an exemplary embodiment. Reactor 801 is charged with contaminated liquid 802, leaving headspace 803. For volatile contaminants, excess hydrogen pressure from the reaction of the hydride can operate to suppress the amount of contaminant in the head space of the vessel and keep the contaminant in liquid phase. Catalyst 805 and hydride 806 are added to reactor 801. A stirring mechanism 807 facilitates the chemical reaction between the contaminant and hydride 806. Effluent 808 exits the reactor.

Several demonstrated embodiments of the above described method are described below to evidence the method's operation and effectiveness.

In a first demonstrated embodiment, the disclosed method was used to reduce the concentration of chloroform in a chloroform-water solution. One liter of water contaminated with 1,051 mg/L of $CHCl_3$ was charged into a 1 gallon reactor. A catalyst of 1.0 gram of Ruthenium on carbon was added to the vessel. A container was placed in the reactor with 10.0 grams of $NaBH_4$. The reactor was sealed and agitated to discharge the $NaBH_4$ into the liquid and the time marked as time zero. The initial pressure in the reactor was 55 psig (4.7 atm). After 6 hours, the pressure had dropped to 8 psig (1.5 atm) and the concentration of $CHCl_3$ was 63 mg/L. Thus, the initial concentration of contaminant was reduced by 94.0%.

In keeping with the repeated hydride additions illustrated in FIG. 7, two additional hydride treatments (each involving 10.0 grams $NaBH_4$) were performed. During each repetition the reaction was provided approximately 5-7 hours to complete. Following the third treatment, the pressure inside the reactor was 40 psig (2.7 atm) and the concentration of CHCl₃ was 1 mg/L. Thus, the initial concentration of contaminant was reduced by 99.9%.

In a second demonstrated embodiment, the disclosed method was used to reduce the concentration of Trichloroethylene (TCE) in a TCE-water solution. One liter of water contaminated with 1,000 mg/L of TCE was charged into a 1 gallon reactor. A catalyst of 1.0 gram of Ruthenium on carbon was added to the reactor. A container was placed in the reactor with 10.0 grams of $NaBH_4$. The reactor was sealed and agitated to discharge the $NaBH_4$ and the time marked as time zero. Initially, the pressure in the reactor was 42.5 psig (3.9 atm). After 25 hours, the pressure had dropped to 0 psig (1.0 atm) and the concentration of TCE was 18 mg/L. Thus, the initial concentration of contaminant was reduced by 98.2%.

In a third demonstrated embodiment, the disclosed method was used to reduce the concentration of TCE with significantly less hydride than in the second demonstrated embodiment. One liter of water contaminated with 1,002 mg/L of TCE was charged into a 1 gallon reactor. A catalyst of 1.0 gram of Ruthenium on carbon was added to the vessel. A container was placed in the reactor with 1.0 gram of $NaBH_4$. The reactor was sealed and agitated to discharge the NaBH4 and the time marked as time zero. There was no significant increase in vessel pressure. After 23 hours, the concentration of TCE was 57 mg/L. Thus, the initial concentration was reduced by 94.3%, while only 10% of the hydride involved in the second demonstrated embodiment was used.

In a fourth demonstrated example, one liter of water contaminated with 218 mg/L of TCE was charged into a 1 gallon reactor. The catalyst was deliberately omitted. A small container was placed in the reactor with 10.0 grams of NaBH4. After the reactor was sealed the vessel was agitated to discharge to the NaBH4 into the liquid. This time is taken as time zero. After 49 hours the concentration of TCE was reduced to 32 mg/L, representing an 84.5% reduction in the initial contaminant concentration.

In a fifth demonstrated embodiment, the disclosed method was used to reduce the concentration of Trichloroethane (TCA) in a TCA-water solution. One liter of water contaminated with 3,002 mg/l of TCA was charged into a 1 gallon reactor. This amount exceeds the solubility of TCA in water and thus there was both soluble and free phase TCA in the solution. A catalyst of 1.05 grams of Ruthenium on carbon was added to the reactor. A container was placed in the reactor with 10.04 grams of $KBH_4$. The reactor was sealed and agitated to discharge the $KBH_4$ and the time taken as time zero. The initial pressure in the reactor was 46 psig (4.1 atm). After 5 hours, the pressure had dropped to 39 psig (3.7 atm). The application of hydride was repeated 4 times. These repetitions allowed all of the free phase TCA to be eliminated and the residual concentration of TCA in aqueous phase to be reduced to 302 mg/L. Thus, the initial contaminant concentration was reduced by 89.9%, even with the presence of free phase contaminant.

In a sixth demonstrated embodiment, the disclosed method was used to reduce the concentration of 1,2-Dichlorobenzene (DCB) in a DCB-water solution. The amount of DCB exceeded the solubility of DCB in water and thus there was both soluble and free phase DCB. A catalyst of 1.0 gram of Ruthenium on carbon was added to the vessel. A container was placed in the reactor with 10.0 grams of $NaBH_4$. The reactor was sealed and agitated to discharge to the $NaBH_4$ and the time taken as time zero. The initial pressure in the reactor was 60 psig (5.1 atm). After 4 hours, the pressure dropped to 56 psig (4.8 atm). The application of hydride was repeated three times. These repetitions allowed all of the free phase DCB to be eliminated and the residual concentration of DCB reduced to 256 mg/L. Thus, the initial contaminant concentration was reduced by 74.4%.

What is claimed is:

1. A method of removing at least one target chemical from a liquid using particles down to 0.2 micrometers in size, the method comprising:
    supplying a source of an aqueous solution of the at least one target chemical on demand to a first reaction chamber;
    providing an average flow rate of the aqueous solution of at least 1 gallon per minute to the first reaction chamber;
    adding a slurry of particles to the first reaction chamber, the first reaction chamber recirculating the particles after mixing with the aqueous solution of the at least one target chemical;
    wherein mixing the aqueous solution with the slurry of particles causes the at least one target chemical to be bound to the particles,
    wherein the particles comprise permanently confined micelle array (PCMA) nanoparticles,
    adding an amount of hydride to the reaction chamber;
    reacting the hydride with the at least one target chemical thereby chemically reducing at least a portion of the at least one target chemical;
    removing an aqueous phase from the first reaction reactor chamber while keeping the particles entrained inside the first reactor chamber using a microfilter;
    wherein said microfilter has a total filter surface area of at least 4 $m^2$;
    supplying the aqueous phase to a dual stage osmosis system;
    rejecting a portion of the aqueous phase from the dual stage osmosis system;
    supplying the rejected portion of the aqueous phase to a second reaction chamber;
    combining the rejected portion of the aqueous phase with carbon dioxide in order to form calcium carbonate;
    adding additional aqueous solution to the first reactor chamber from a source until the particles are saturated;
    removing and replacing the particles in a final cycle of a particle charge lifetime;
    recovering the at least one target chemical from the particles such that the particles can be reused;
    wherein the time required to complete the decreasing said concentration of the at least one target chemical in the liquid is not substantially more than 15 minutes.

2. The method of claim 1 wherein the first reaction chamber is a sealable reaction chamber, and wherein the first reaction chamber has an amount of headspace, whereby pressure in the first reactor substantially maintains the at least one target chemical in liquid phase.

3. The method of claim 1 wherein the PCMA nanoparticles comprise Ti-PCMA nanoparticles.

4. The method of claim 1 wherein the PCMA nanoparticles comprise Fe-PCMA nanoparticles.

5. The method of claim 1 wherein the hydride is $LiAlH_4$.

6. The method of claim 1 wherein the at least one target chemical is selected from the group consisting of $CHCl_3$, Trichloroethylene (TCE), Trichloroethane (TCA), Dichlorobenzene (DCB), Cu, 1,1-dichloroethene (DCE) and dioxane.

7. The method of claim 1 wherein the amount of the at least one target chemical in the liquid, when the first reactor is charged with the liquid, exceeds the solubility of the at least one target chemical in the liquid.

8. The method of claim 1, further comprising:
    measuring the concentration of the at least one target chemical remaining in the liquid;
    comparing the concentration of the at least one target chemical remaining to a desired level;
    repeating the steps of introducing an amount of hydride, measuring the concentration of the at least one target chemical remaining and comparing the concentration of the at least one target chemical remaining to the desired level until the concentration of contaminant remaining is less than the desired level.

9. The method of claim 1 wherein the first reaction chamber is sealable and capable of withstanding pressure less than or equal to 150 psig.

10. The method of claim 1 wherein the first reaction chamber is capable of stirring the aqueous solution, the particles, and the hydride.

\* \* \* \* \*